United States Patent
Heidermark et al.

(10) Patent No.: US 8,825,875 B2
(45) Date of Patent: Sep. 2, 2014

(54) SESSION ESTABLISHMENT IN A COMMUNICATION NETWORK

(75) Inventors: Alf Heidermark, Saltsjobaden (SE); Christer Holmberg, Kirkkonummi (FI); Fredrik Lindholm, Stockholm (SE); Hubert Przybysz, Hagersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 712 days.

(21) Appl. No.: 13/122,042

(22) PCT Filed: Oct. 3, 2008

(86) PCT No.: PCT/EP2008/063301
§ 371 (c)(1), (2), (4) Date: Mar. 31, 2011

(87) PCT Pub. No.: WO2010/037428
PCT Pub. Date: Apr. 8, 2010

(65) Prior Publication Data
US 2011/0202666 A1 Aug. 18, 2011

(51) Int. Cl.
G06F 15/16 (2006.01)

(52) U.S. Cl.
USPC .......................................... 709/227; 709/228

(58) Field of Classification Search
CPC . H04L 65/1016; H04L 65/1006; H04L 69/24; H04L 65/1069; H04L 65/106
See application file for complete search history.

(56) References Cited

U.S. PATENT DOCUMENTS

| 7,688,745 | B1* | 3/2010 | Hurtta et al. | 370/252 |
| 8,175,597 | B2* | 5/2012 | Song et al. | 455/435.1 |
| 2002/0181495 | A1* | 12/2002 | Requena et al. | 370/465 |
| 2005/0058125 | A1* | 3/2005 | Mutikainen et al. | 370/354 |
| 2006/0256748 | A1* | 11/2006 | Jung et al. | 370/328 |

FOREIGN PATENT DOCUMENTS

| WO | 0215625 A1 | 2/2002 |
| WO | 02/096145 A1 | 11/2002 |
| WO | 02096145 A1 | 11/2002 |
| WO | 2008 084911 A1 | 7/2008 |
| WO | 2008/084911 A1 | 7/2008 |

OTHER PUBLICATIONS

Office Action issued in corresponding Japanese patent application No. 2011-529453 on Dec. 21, 2012, 3 pages.

(Continued)

*Primary Examiner* — Peling Shaw
(74) *Attorney, Agent, or Firm* — Rothwell, Figg, Ernst & Manbeck P.C.

(57) ABSTRACT

A method and apparatus for establishing a communication session in an IMS Centralized Services communication network. A Service Centralization and Continuity Application Server (SCC AS) receives a request from an originating device to establish a session with a target device. The request includes a plurality of codec identifiers that could be used by the originating device. The SCC AS sends a second request to establish the session to the target device. The SCC AS subsequently receives, from an intermediate node between the SCC AS and the target device, an invite message. The invite message includes an indication that a codec identifier has been selected from the plurality of codec identifiers. The SCC AS then sends a message to the intermediate node instructing the intermediate node to establish the session.

16 Claims, 4 Drawing Sheets

(56) References Cited

OTHER PUBLICATIONS

"Universal Mobile Telecommunications System (UMTS); IMS Multimedia telephony service and supplementary services; Stage 3 (3GPP TS 24.173 version 8.2.0 Release 8)'"; ETSI TS 124 173 ETSI Standard, European Telecommunications Standards Institute (ETSI), Sophia Antipolis Cedex, France, vol. 3-CT1, No. V8.2.0, Oct. 1, 2008, 24 pages, XP014042429.

State Intellectual Property Office, P.R. China, Application No. 200880131438.6, Decision on Rejection, Dated Dec. 4, 2013.

3GPP TS 24.292 V1.0.0 (Sep. 2008), 3GPP, p. 103 Section A.5.6 to p. 111, p. 83 section A.5.3 to p. 91, publication date Sep. 30, 2008.

EPO communication pursuant to Article 94(3) EPC; application No. 08 875 153.2-1856 dated Jan. 28, 2014.

EPO Form 2906; application No. 08 875 153.2; dated Jan. 28, 2014.

Universal Mobile Telecommunication System (UMTS); IMS Multimedia telephony service and supplementary services; Stage 3 (3GPP TS 24.173 version 8.2.0 Release 8); ETSI TS 124 173:, ETSI Standard, European Telecommunications Standards Institute (ETSI), Sophia Antipolis Cedex, France, vol. 3 3-CT1, No. V8.2.0, Oct. 1, 2008.

* cited by examiner

SESSION ESTABLISHMENT IN A COMMUNICATION NETWORK

CROSS REFERENCE TO RELATED APPLICATION(S)

This application is a 35 U.S.C. §371 National Phase Entry Application from PCT/EP2008/063301, filed Oct. 3, 2008, and designating the United States. The disclosure of which is incorporated herein in its entirety by reference.

TECHNICAL FIELD

The invention relates to the field of session establishment in a communication network, and in particular to session setup in an ICS communication network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. As the number of basic applications, and the media which it is possible to combine, increases, so will the number of services offered to the end users, giving rise to a new generation of personalised, rich multimedia communication services. The IMS is defined in the 3GPP Specification 23.228.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Figure 1:
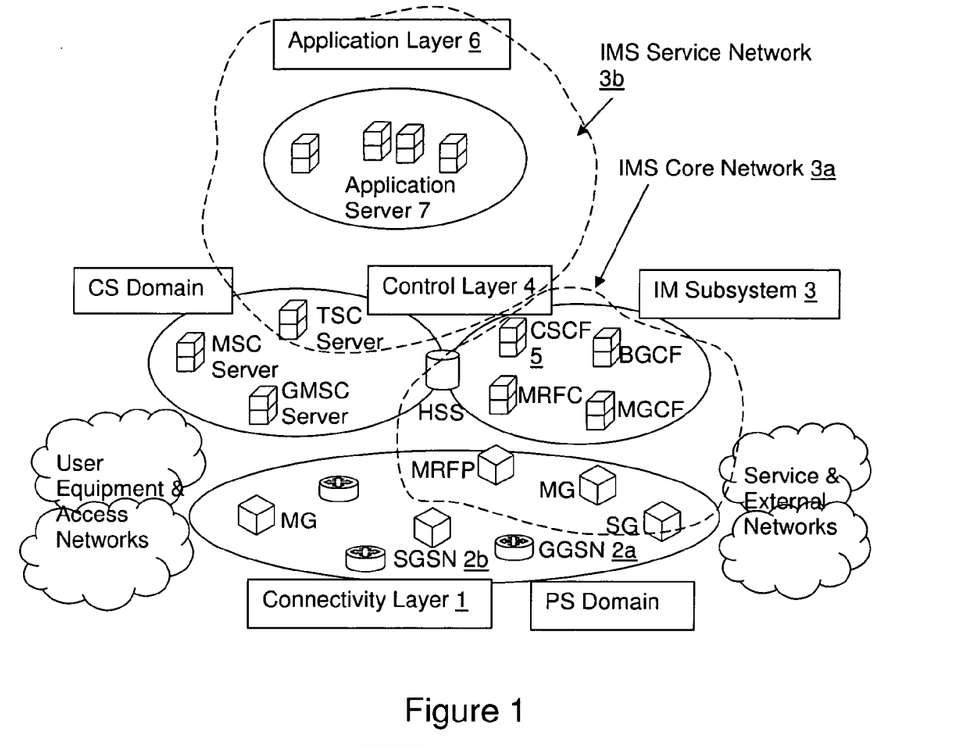
FIG. 1 illustrates schematically in a block diagram an IP Multimedia Subsystem network.

FIG. 1 illustrates schematically how the IMS 3 fits into the mobile network architecture in the case of a GPRS/PS access network. As shown in FIG. 1 control of communications occurs at three layers (or planes). The lowest layer is the Connectivity Layer 1, also referred to as the bearer, or traffic plane and through which signals are directed to/from user terminals accessing the network. The GPRS network includes various GPRS Support Nodes (GSNs) 2a, 2b. A gateway GPRS support node (GGSN) 2a acts as an interface between the GPRS backbone network and other networks (radio network and the IMS network). A Serving GPRS Support Node (SGSN) 2b keeps track of the location of an individual Mobile Terminal and performs security functions and access control. Access to the IMS 3 by IMS subscribers is performed through an IP-Connectivity Access Network (IP-CAN). In FIG. 1 the IP-CAN is a GPRS network including entities linking the user equipment to the IMS 3 via the connectivity layer 1.

The IMS 3 includes a core network 3a, which operates over the Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5. The CSCFs 5 include Serving CSCFs (S-CSCF) and Proxy CSCFs (P-CSCF), which operate as SIP proxies within the IMS in the middle, Control Layer.

At the top is the Application Layer 6, which includes the IMS service network 3b. Application Servers (ASs) 7 are provided for implementing IMS service functionality. Application Servers 7 provide services to end-users on a session-by-session basis, and may be connected as an end-point to a single user, or "linked in" to a session between two or more users. Certain Application Servers 7 will perform actions dependent upon subscriber identities (either the called or calling subscriber, whichever is "owned" by the network controlling the Application Server 7).

Figure 2:
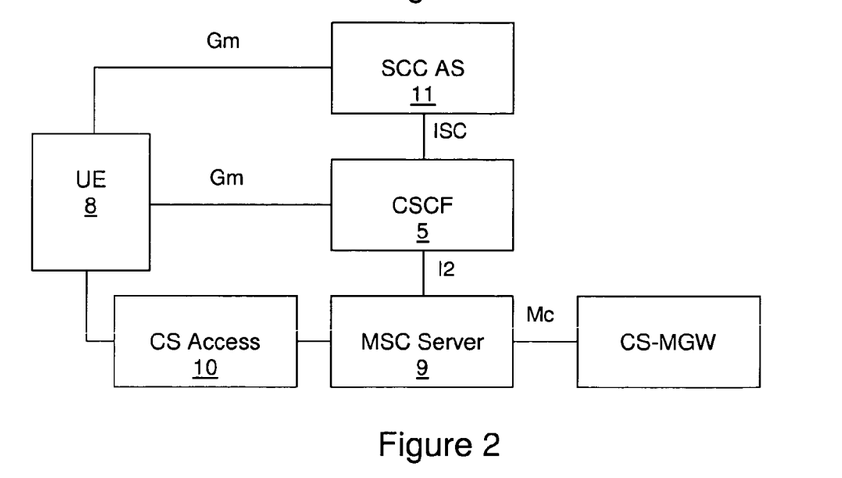
FIG. 2 illustrates schematically in a block diagram an IMS Centralized Services network.

IMS relies on Internet Protocol (IP) as a transport technology. Using IP for voice communications, however, presents some challenges, especially in the mobile community where Voice Over IP (VoIP) enabled packet switched (PS) bearers may not always be available. To allow operators to start offering IMS-based services while voice enabled PS-bearers are being built out, the industry has developed solutions that use existing Circuit Switched (CS) networks to access IMS services. These solutions are referred to as IMS Centralized Services (ICS). ICS is also the name of the Work Item in 3GPP Release 8 addressing these matters. ICS allows a User Equipment (UE) to connect to a CS access in order to have access to Multimedia Telephony services as defined in 3GPP TS 24.173. Referring to FIG. 2, a UE 8 can access an MSC Server 9 via a CS Access network 10. It also accesses a CSCF 5 via a Gm reference point, and a Service Centralization and Continuity Application Server (SCC AS) 11 via a Gm reference point.

SIP is used to perform service control between the ICS UE 8 and the SCC AS 11 over the Gm interface.

For a speech service, the ICS UE 8 can use its CS access to transfer voice media. The ICS specification defines how it is possible to use a CS bearer controlled via the Gm interface.

The 3GFPP Release 8 ICS specification describes two different types of MSCs; an unmodified MSC and an enhanced MSC. In an IMS architecture, the enhanced MSC can behave as a P-CSCF with some User Agent functions. It also provides inter-working between the CS signalling system in accordance with 3GPP TS 24.008 and SIP in accordance with 3GPP TS 24.229.

When a SCC AS 11 receives an incoming call, or other type of session request, with a voice component (or other type of media component that requires a codec, such as video), it will select an access domain. In this scenario, the SCC AS 11 decides to use the CS bearer. The SCC AS 11 includes in an INVITE request a telephone number (SCC AS PSI PN) and, in the SDP, a CS bearer indication. When the ICS UE 8 receives the INVITE request it will use the telephone number to set up the call in the CS domain by including the telephone number in the Set-up message. According to standard 3GPP TS 24008 procedure, the ICS UE 8 also includes the speech codecs that it normally uses for a speech call.

When the set-up comes to the MSC 9 it can either act as an enhanced MSC or a normal MSC. In the case that the MSC 9 acts as an enhanced MSC, it converts the set-up message into an INVITE request with the all the codecs included in the SDP, and includes the SCCAS:PSI as a Request URI. When the SCC AS 11 receives the SIP INVITE request it removes all codecs except one before it includes the SDP from the CS domain in the SDP answer sent to the originating UE. The SCC-AS 11 sends a SDP answer to the MSC server that will include the remaining codec chosen by the SCC AS 11. When the MSC server gets the SDP answer, which only includes the chosen codec, it can start radio bearer assignment.

In the case that the MSC acts as a normal MSC, it includes the codecs in the inter exchange signalling system, and the codecs will be transported to a Media Gateway Control Function (MGCF), where it is converted or included in SIP signalling that is sent to the SCC AS 11. The SCC AS 11 sends a SDP answer that is transported via the inter exchange signalling system. When the MSC server 9 receives the acknowledgement of the set up of the inter exchange circuits it can use the codec to set up the call.

Note that the ISDN User Part (ISUP) in the signalling system does not support the inclusion of codecs in the signalling. A normal 64 kbit/s PCM codec is assumed.

Figure 3:
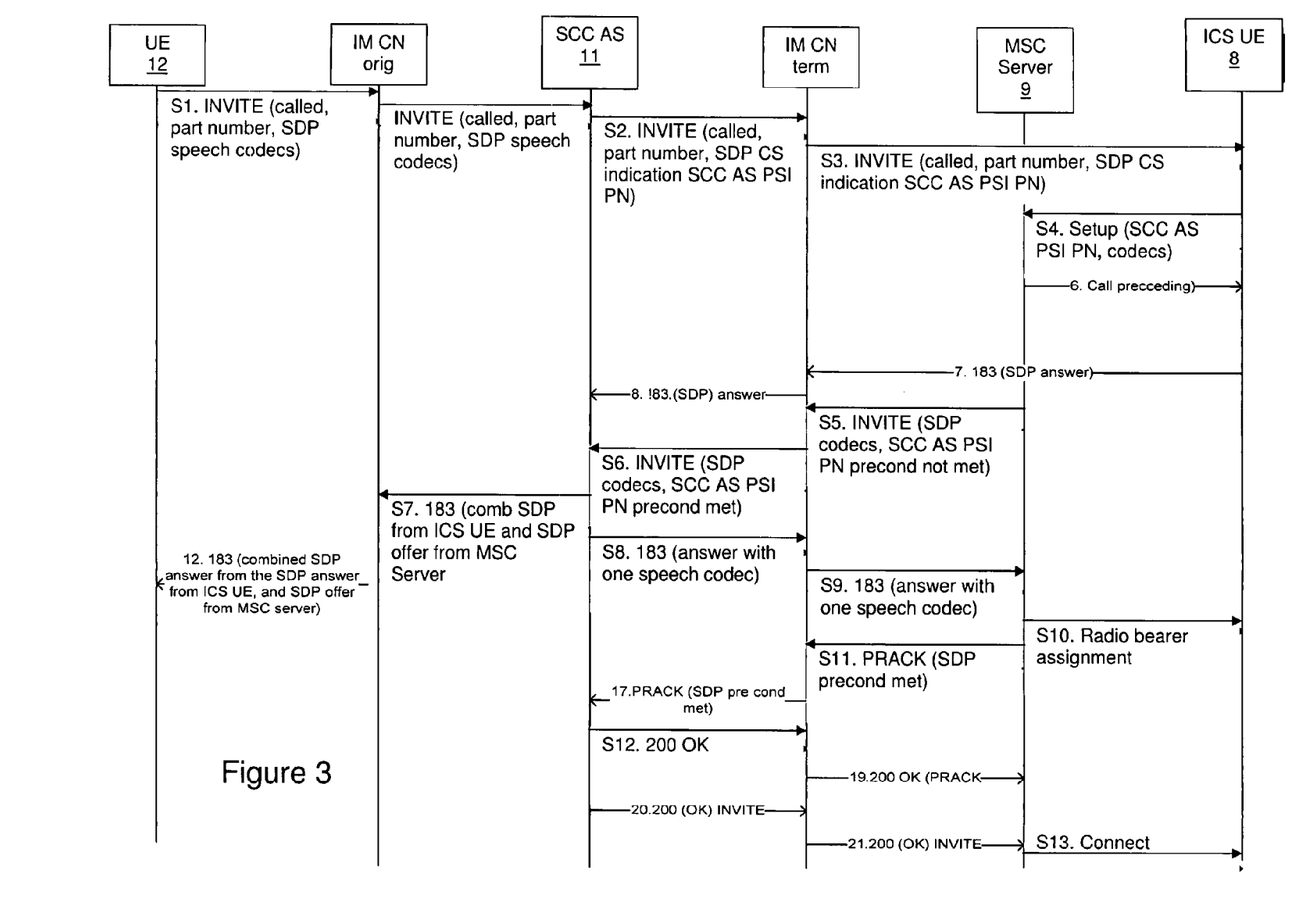
FIG. 3 is a signalling diagram showing the signalling required to set up a call according to a prior art method.

FIG. 3 shows the call signalling according to a known method, with the following numbering corresponding to the numbering in the Figure. An originating UE 12 sends an INVITE S1 to the SCC AS 11. The SCC AS 11 inserts an indication using SDP that a CS bearer will be used together with a telephone number named SCC-AS PSI PN and sends the INVITE S2 to ICS UE 8. The ICS UE 8 uses the telephone number to set up a CS call S4 to an MSC server 9. The setup request includes the SCC AS PSI PN number in the set-up message together with all speech codecs supported for the radio bearer. The MSC server 9, in accordance with TS 29.292, sends S5 a SIP INVITE request, which includes SCC AS PSI PN in the Request URI and the received codecs in the SDP, and indicates that a precondition is not met. In this scenario, the SIP precondition that must be fulfilled before the user is alerted is that the CS bearer must be established. This SIP INVITE request is sent S6 to the SCC AS 11. Before the SCC AS 11 sends an SDP answer to the originating UE 12 and the MSC 9, the SCC AS 11 includes in the SDP answer S7 to the originating UE 12 and the SDP answer S8 to the MSC server 9 only one codec of the received codecs from the MSC 9, which was also received from the originating UE. When the SDP answer S9 is received at the MSC 9 it initiates the radio assignment S10 and send a PRACK S11 to the SCC AS indicating that the precondition has now been is met. After acknowledging the PRACK, the SCC AS 11 sends a 200 (OK) S12 to the MSC Server 9, which then sends a connect S13 to the ICS UE 8.

SUMMARY

Using existing signalling to establish a session such as a call with an ICS UE, the establishment of the radio bearer is delayed by selecting codecs and amending messages to remove extraneous codecs that will not be used in the session. Existing systems can, in some case, lead to more frequent use of transcoding, which will lead to higher costs for the session, and to lower transmission quality.

According to a first aspect of the invention, there is provided a method of establishing a communication session in an IMS Centralized Services communication network. A Service Centralization and Continuity Application Server (SCC AS) receives a request from an originating device to establish a session with a target device. The request includes a plurality of codec identifiers that could be used by the originating device. The SCC AS sends a second request to establish the session to the target device. The SCC AS subsequently receives, from an intermediate node between the SCC AS and the target device, an invite message. The invite message includes an indication that a codec identifier has been selected from the plurality of codec identifiers. The SCC AS then sends a message to the intermediate node instructing the intermediate node to establish the session. In this way, additional signalling is not required to establish which codec will be used, and session setup is performed more quickly.

The messages are optionally sent using Session Initiation Protocol messages. As a further option, the plurality of codec identifiers identify codecs selected from audio codecs and video codecs. Audio codecs will be most commonly used in a typical voice call scenario. The second request to establish the session optionally includes an indication that a CS bearer is to be used between the SCC AS and the target device.

According to a second aspect of the invention, there is provided a method of establishing a communication session in an ICS communication network. AN ICS-enabled device receives a request to establish a session with an originating device from an SCC AS. The request includes a plurality of codec identifiers identifying codecs that can be used in the session. The ICS-enabled device then selects a codec identifier from the plurality of codec identifiers, the selected codec identifier identifying the codec to be used in the session. A setup message is then sent to a MSC Server that serves the device, the setup message including the selected codec identifier. As an option, the method further comprises selecting the codec identifier on the basis of a list of codec priorities.

According to a third aspect of the invention, there is provided a SCC AS for use in a communication network. The SCC AS is provided with a first receiver for receiving from an originating device a request to establish a session with a target device. The request includes a plurality of codec identifiers. A processor is provided for amending the request to include an indication that a Circuit Switched bearer is to be used between the Service Centralization and Continuity Application Server and the target device. A first transmitter is provided for sending the amended message to the target device, and a second receiver is provided for receiving from an intermediate node between the SCC AS and the target device an invite message. The invite message includes an indication that a codec identifier has been selected from the plurality of codec identifiers. A second transmitter is provided for transmitting a message to the intermediate node, the message instructing the intermediate node to establish the session. This apparatus assists in providing a quicker session setup compared to a known SCC AS.

As an option, the messages are received and sent using SIP messages, and the intermediate node is optionally selected from one of a Mobile Switching Centre Server, a Media Gateway Control Function, and a Mobile Switching Centre.

According to a fourth aspect of the invention, there is provided an ICS-enabled device for use in a communication network. The device is provided with a receiver for receiving from a SCC AS a request to establish a session. The request includes a plurality of codec identifiers identifying codecs that can be used in the session. A processor is provided to select a codec identifier from the plurality of codec identifiers, the selected codec identifier identifying the codec to be used in the session. A transmitter is also provided for transmitting a setup message to an intermediate node such as an MSC Server serving the device, the setup message including the selected codec identifier.

As an option, the processor is arranged to select the codec identifier on the basis of a list of codec priorities, and the device is optionally further provided with a database of codec priorities to assist in the selection process.

DETAILED DESCRIPTION

According to the invention, when the SCC AS 11 sends the SIP INVITE that includes an indication that a CS bearer is to be used, it also includes the codecs received from the originating UE 12. When the ICS UE 8 receives the SIP INVITE request with the SDP, this INVITE message now includes the codecs. These codecs may be for speech in a voice call, or video in a video call.

When the ICS UE 8 receives the SIP INVITE request with the SDP, which includes the codecs as earlier sent from the SCC AS 11, the ICS UE 8 selects the codec with the highest priority and includes it in a set-up message. The MSC server 9 therefore receives only one codec, and so it can start the assignment of a radio access bearer straight away. According to TS 29.292, the MSC server 9 indicates in a SIP INVITE to the SCC AS 11 that the codec precondition is fulfilled, which therefore leads to quicker call set up for the rest of the call set up procedure.

Figure 4:
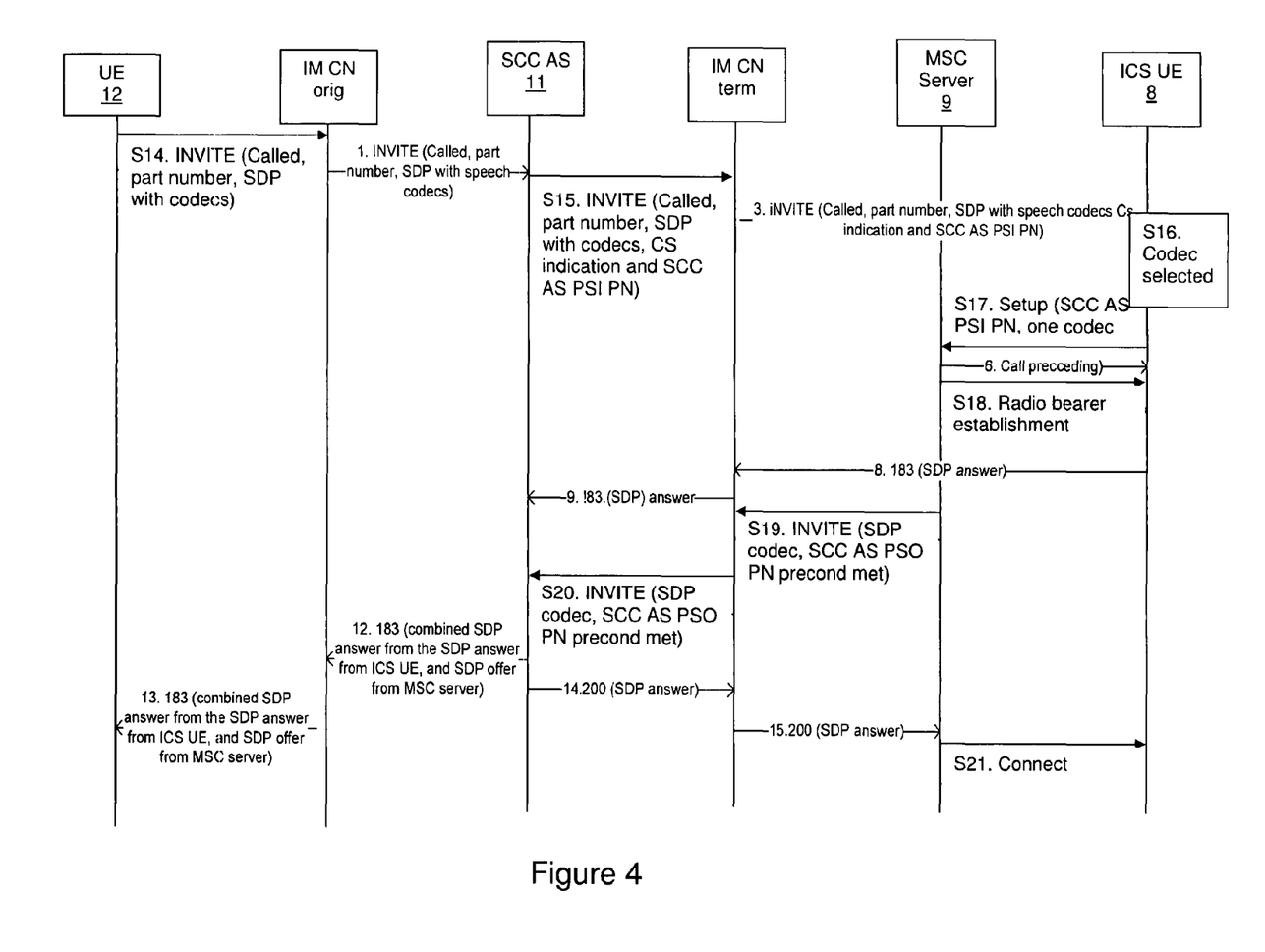
FIG. 4 is a signalling diagram showing signalling required to set up a call according to an embodiment of the invention.

FIG. 4 shows the signalling in more detail, with the following numbering corresponding to the numbering shown in FIG. 4.

S14. The originating UE 12 sends a SIP INVITE including speech codecs to the SCC AS 11.

S15. The SCC AS 11 includes the codecs as received from the originating UE 12, and sends a SIP INVITE to the ICS UE 8.

S16. When the ICS UE 8 receives the SIP INVITE it selects the codec with the highest priority that is supported by the ICS UE S17. The ICS UE 8 sends a setup request to the MSC server 9. The setup request includes the selected codec.

S18. The MSC server 9 starts to set-up the radio bearer.

S19. The MSC server 9 also sends a SIP INVITE message to the SCC AS 11. The SIP INVITE message 19 includes the selected codec, the SCC AS PSI PN, and an indication that the codec precondition is met.

S20. AS the SCC AS 11 is aware that the codec precondition is met, it sends a 200 (OK) INVITE to the MSC server 9.

S21. The MSC server 9 through-connects and send a connect message to the ICS UE 8.

It is apparent when making a comparison of FIGS. 3 and 4 that the invention greatly reduces the signalling required and the time required to establish a voice or video session.

Figure 5:
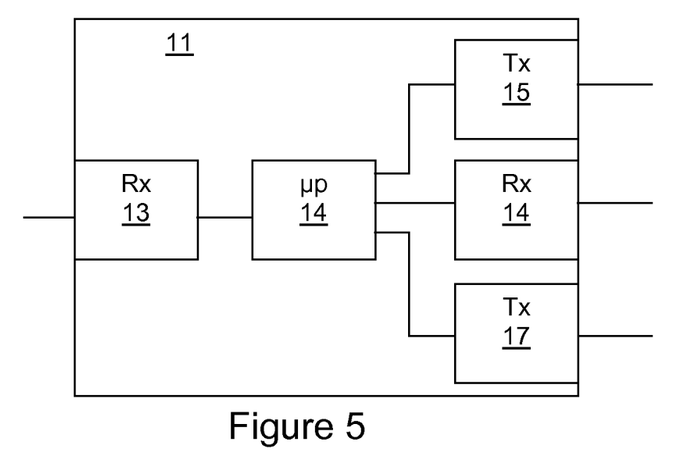
FIG. 5 illustrates schematically in a block diagram a Service Centralization and Continuity Application Server according to an embodiment of the invention.

Referring to FIG. 5, the SCC AS 11 is provided with a first receiver 13 for receiving from the originating UE 12 a request to establish a session with the ICS UE 8. As described above, the request details a list of codecs that can be used in the call. A processor 14 is provided for amending the request to include an indication that a CS bearer is to be used between the SCC AS 11 and the ICS UE 8. A first transmitter 15 is used for sending the amended message to the ICS UE 8, and a second receiver 16 is provided for receiving from the MSC Server 9 an invite message that includes an indication that a codec has been selected for use in the call. A second transmitter 17 is provided for transmitting a message to the MSC Server 9, the message instructing the MSC Server 9 to establish the session.

Figure 6:
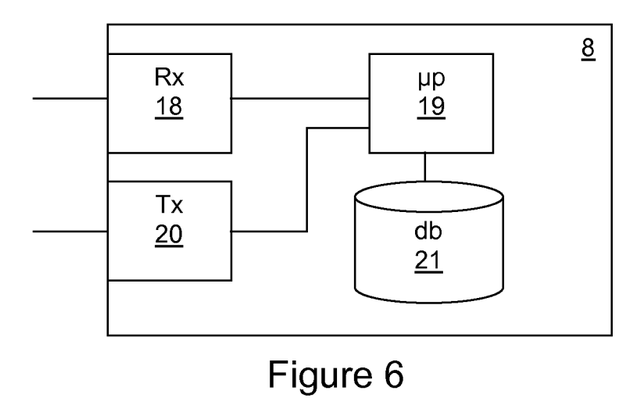
FIG. 6 illustrates schematically in a block diagram an ICS User Equipment according to an embodiment of the invention.

FIG. 6 illustrates the ICS UE 8, which is provided with a receiver 18 for receiving from the SCC AS 11 the SIP INVITE request to establish a call, the request including a plurality of codec identifiers identifying codecs that can be used in the session. A processor 19 is also provided to select a codec identifier from the plurality of codec identifiers, the selected codec identifier identifying the codec to be used in the session. A transmitter 20 is provided for transmitting a setup message to a MSC Server 9, the setup message including the selected codec identifier. A database 21 may be provided listing codec priorities. This can be used by the processor in selecting a codec to be used.

Figure 7:
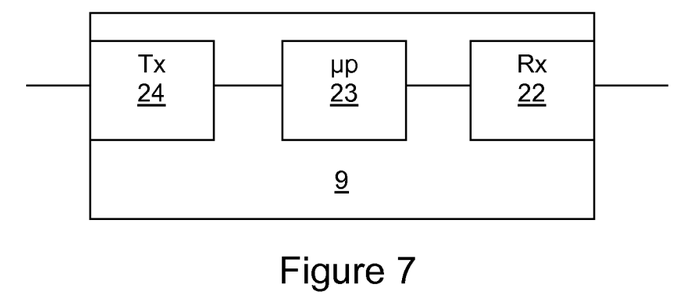
FIG. 7 illustrates schematically in a block diagram a Mobile Switching Centre Server according to an embodiment of the invention.

FIG. 7 illustrates an MSC Server 9 according to an embodiment of the invention, which is provided with a receiver 22 for receiving from the ICS UE 8 a setup message which includes an identifier of the selected codec. A processor 23 is provided for generating an invite message, the invite message including an indication that the codec has been selected, and a transmitter 24 is provided for sending the invite message to the SCC AS 11.

It will be appreciated by the person of skill in the art that various modifications may be made to the above-described embodiments without departing from the scope of the present invention as defined in the appended claims.

The invention claimed is:

1. A method of establishing a communication session in an IMS Centralized Services (ICS) communication network, the method comprising:

a Service Centralization and Continuity Application Server (SCC AS) receiving from an originating device a first request to establish a session with a target device, the first request comprising a plurality of codec identifiers;

the SCC AS sending a second request to establish the session to the target device;

the SCC AS receiving from an intermediate node an invite message including an indication that a codec identifier from the plurality of codec identifiers has been selected by the target device; and the SCC AS, in response, sending a message back to the intermediate node, the message instructing the intermediate node to establish the session.

2. The method according to claim 1, wherein the messages are sent using Session Initiation Protocol messages.

3. The method according to claim 1, wherein the plurality of codec identifiers identify codecs selected from audio codecs and video codecs.

4. The method according to claim 1, wherein the second request to establish the session further comprises an indication that a Circuit Switched (CS) bearer is to be used between the SCC AS and the target device.

5. The method of claim 1, wherein the intermediate node is a mobile switching centre (MSC).

6. The method of claim 1, wherein the intermediate node transmits the invite message as a result of receiving a setup request from the target device.

7. A method of establishing a communication session in an IMS Centralized Services (ICS) communication network, the method comprising:

an ICS enabled device receiving from a Service Centralization and Continuity Application Server (SCC AS) a request to establish a session, the request including a plurality of codec identifiers identifying codecs that can be used in the session;

the ICS enabled device selecting a codec identifier from the plurality of codec identifiers, the selected codec identifier identifying the codec to be used in the session; and the ICS enabled device sending a setup message to a Mobile Switching Centre (MSC) Server serving the ICS enabled device, the setup message including the selected codec identifier.

8. The method according to claim 7, the method further comprising selecting the codec identifier on the basis of a list of codec priorities.

9. A Service Centralization and Continuity Application Server (SCC AS) for use in a communication network, the SCC AS comprising:

a first receiver for receiving from an originating device a request to establish a session with a target device, the request comprising a plurality of codec identifiers;

a processor for amending the request to include an indication that a Circuit Switched bearer is to be used between the SCC AS and the target device;

a first transmitter for sending the amended message to the target device;

a second receiver for receiving from an intermediate node an invite message including an indication that a codec identifier from the plurality of codec identifiers has been selected by the target device; and a second transmitter for transmitting a message to the intermediate node, the message instructing the intermediate node to establish the session.

10. The Service Centralization and Continuity Application Server according to claim 9, wherein the messages are received and sent using Session Initiation Protocol (SIP) messages.

11. The Service Centralization and Continuity Application Server according to claim 9, wherein the intermediate node is selected from one of a Mobile Switching Centre (MSC) Server and a Media Gateway Control Function (MGCF).

12. An IP Multimedia Centralized Services (ICS) enabled device for use in a communication network, the device comprising:

a receiver for receiving, from a Service Centralization and Continuity Application Server (SCC AS), a request to establish a session, the request including a plurality of codec identifiers identifying codecs that can be used in the session;

a processor arranged to select a codec identifier from the plurality of codec identifiers, the selected codec identifier identifying the codec to be used in the session; and a transmitter for transmitting a setup message to a Mobile Switching Centre (MSC) Server serving the device, the setup message including the selected codec identifier.

13. The device according to claim 12, wherein the processor is arranged to select the codec identifier on the basis of a list of codec priorities.

14. The device according to claim 13, further comprising a database of codec priorities.

15. A method of establishing a communication session in an IMS Centralized Services (ICS) communication network, the method comprising:

a Service Centralization and Continuity Application Server (SCC AS) receiving from an originating device a first request to establish a session with a target device, the first request comprising a plurality of codec identifiers;

the SCC AS sending a second request to establish the session to the target device;

the SCC AS receiving from an intermediate node an invite message including an indication that a single codec identifier from the plurality of codec identifiers has been selected by the target device; and the SCC AS, in response, sending a message back to the intermediate node, the message instructing the intermediate node to establish the session based on the selected single codec.

16. A method of establishing a communication session in an IMS Centralized Services (ICS) communication network, the method comprising:

a ICS enabled device receiving from a Service Centralization and Continuity Application Server (SCC AS) a request to establish a session, the request including a plurality of codec identifiers identifying codecs that can be used in the session;

the ICS enabled device selecting a single codec identifier from the plurality of codec identifiers, wherein the selected single codec identifier identifies the codec to be used in the session and is selected from multiple codec identifiers supported by the device; and the ICS device sending a setup message to a Mobile Switching Centre (MSC) Server serving the device, the setup message including the selected single codec identifier.

* * * * *

UNITED STATES PATENT AND TRADEMARK OFFICE
CERTIFICATE OF CORRECTION

PATENT NO. : 8,825,875 B2  
APPLICATION NO. : 13/122042  
DATED : September 2, 2014  
INVENTOR(S) : Heidermark et al.

Page 1 of 1

It is certified that error appears in the above-identified patent and that said Letters Patent is hereby corrected as shown below:

On the title page, illustrative Figure, in Box "3", in Line 1, delete "IM Subsystem" and insert -- IMS Subsystem --, therefor.

In the Drawings

In Fig. 1, Sheet 1 of 4, in Box "3", in Line 1, delete "IM Subsystem" and insert -- IMS Subsystem --, therefor.

Signed and Sealed this
Seventh Day of July, 2015

Michelle K. Lee
*Director of the United States Patent and Trademark Office*